(12) United States Patent
Danner et al.

(10) Patent No.: US 7,194,003 B2
(45) Date of Patent: Mar. 20, 2007

(54) ETHERNET SWITCH AND SYSTEM

(75) Inventors: Phillip A. Danner, Earlysville, VA (US); William B. Estep, Keswick, VA (US); Paul D. Scanlon, Earlysville, VA (US); Robert A. Rucinski, Charlottesville, VA (US); Robert A. McKeel, Charlottesville, VA (US)

(73) Assignee: General Electric Company, Schenectady, NY (US)

(*) Notice: Subject to any disclaimer, the term of this patent is extended or adjusted under 35 U.S.C. 154(b) by 663 days.

(21) Appl. No.: 10/066,532

(22) Filed: Jan. 31, 2002

(65) Prior Publication Data

US 2003/0081620 A1 May 1, 2003

Related U.S. Application Data

(63) Continuation-in-part of application No. 09/682,883, filed on Oct. 29, 2001.

(51) Int. Cl.
 *H04L 12/28* (2006.01)
 *H04L 12/56* (2006.01)
 *G06F 15/16* (2006.01)

(52) U.S. Cl. .................. 370/400; 709/224; 709/228

(58) Field of Classification Search ........ 370/400–403, 370/389, 395, 338, 216, 393, 369, 254, 461, 370/503, 446, 351–356, 392, 376, 224, 390; 538/412; 231/420, 458, 352, 401; 709/204, 709/217, 238, 240, 106, 202, 245, 219, 206, 709/223–229, 249; 710/11; 340/644, 584, 340/961; 345/340, 339; 718/106; 715/88; 361/704; 713/153; 455/456.1, 456.2
See application file for complete search history.

(56) References Cited

U.S. PATENT DOCUMENTS

| | | | | |
|---|---|---|---|---|
| 5,751,967 A * | 5/1998 | Raab et al. | ................. | 709/228 |
| 5,974,467 A * | 10/1999 | Haddock et al. | ............ | 709/240 |
| 6,128,665 A * | 10/2000 | Iturralde | ..................... | 709/238 |
| 6,144,638 A * | 11/2000 | Obenhuber et al. | ......... | 370/231 |
| 6,154,770 A * | 11/2000 | Kostakos | .................... | 709/217 |
| 6,239,798 B1 * | 5/2001 | Ludolph et al. | ............ | 715/788 |
| 6,393,473 B1 * | 5/2002 | Chu | ........................... | 709/223 |
| 6,466,995 B2 * | 10/2002 | Swales et al. | ................ | 710/11 |
| 6,505,228 B1 * | 1/2003 | Schoening et al. | ......... | 718/106 |
| 6,665,285 B1 * | 12/2003 | Treadaway et al. | ......... | 370/338 |
| 6,760,748 B1 * | 7/2004 | Hakim | ....................... | 709/204 |
| 7,027,394 B2 | 4/2006 | Gupta et al. | | |
| 7,072,360 B2 | 7/2006 | Dravida et al. | | |
| 2001/0043603 A1 * | 11/2001 | Yu | ............................. | 370/393 |
| 2002/0112076 A1 * | 8/2002 | Rudeda et al. | ............. | 709/245 |
| 2005/0122689 A1 * | 6/2005 | Pozzuoli | .................... | 361/704 |

OTHER PUBLICATIONS

Saunders, S., "Building Virtual LANS on a Real-World Budget Lanart's Segway Works with Ethernet Switches to Deliver Virtual LANS Powers at a Low Cost", Data Communications, vol. 24, No. 13, Sep. 21, 1995, pp. 39/40.*

(Continued)

*Primary Examiner*—Chi Pham
*Assistant Examiner*—Prenell Jones
(74) *Attorney, Agent, or Firm*—Mark A. Conklin; Armstrong Teasdale LLP

(57) ABSTRACT

An Ethernet switch includes a plurality of ports, wherein the switch is configured to be operable within a temperature range of at least between approximately 0° C. and approximately 60° C. The switch is further configured to be operable within a non-condensing humidity range of at least between approximately 10% and approximately 95%. The switch is further configured to support at least one of a Virtual Local Area Network (VLAN), a Quality of Service (QoS), a Remote Monitoring (RMON), and a Spanning Tree, and the switch is configured to be upgradeable using a plug in device.

21 Claims, 3 Drawing Sheets

OTHER PUBLICATIONS

"Virtual LANS Get Real Ethernet Switch Makers are Taking the Lead in Deploying Virtual LANS Across Campus Networks," Data Communications, vol. 24, No. 3, Mar. 1, 1995.*

COMPAQ, "Compaq SW5425 Desktop Gigabit Ethernet Switch", Jun. 15, 1999, World Wide QuickSpecs, Version 1, pp. 1-7.*

Thompson, S.; Intelligent Hub Access System; MILCOM 2000. 21st Century Military Communications Conference Proceedings vol. 1, Oct. 22-25, 2000; pp. 35-39 vol. 1.*

GarrettCom Europe Group; Ethernet Lan Switches for Harsh Environments; Engineeringtalk, Engineeringtalk editorial team, Mar. 6, 2001; pp. 1-2.*

* cited by examiner

ETHERNET SWITCH AND SYSTEM

CROSS REFERENCE TO RELATED APPLICATIONS

This application is a Continuation-in-Part of U.S. patent application Ser. No. 09/682,883 filed Oct. 29, 2001 and assigned to the assignee of the present invention.

BACKGROUND OF THE INVENTION

This invention relates generally to industrially hardened Ethernet switches, and more particularly, to systems including an industrially hardened Ethernet switch.

If an industrial user or other non-office user desires a feature laden Ethernet switch for use in a harsh environment, the industrial user has heretofore used an office grade switch and has built an environmentally protective enclosure in which to place the office grade switch. The environmentally protective enclosure is not an industrial enclosure e.g., an enclosure built according to the National Electrical Manufacturers Association's NEMA 12 standard. Rather, the environmentally protective enclosure typically includes a temperature control. Thus, the environmentally protective enclosures typically cost more than the office grade switch, and sometimes up to ten times more. Accordingly, the conventional placing of an office grade switch in a user built environmentally protective enclosure tends to be costly and oftentimes not cost-effective.

Additionally, at least some known production systems a including an office side, and a production side. The office side is networked using an Ethernet IP (Internet protocol) based Enterprise network and the production side is networked using a plurality of different legacy propriety network protocols. For example, a control network connects a plurality of process controllers to each other, and also connects at least one personal computer (PC) and at least one view screen together and to the process controllers. A device network, which is a separate network from the control network and the Ethernet network, connects a plurality of input/outputs (I/Os) and other end devices.

The device and control networks are not only separate and distinct from the Ethernet network, but they are typically proprietary. It may be less than optimal to have so many networks, and also may be expensive because the formation of so many networks includes numerous components and may cost more than forming a single network. Additionally, when maintaining so many networks, more spare parts typically are stocked, maintenance workers must be trained on multiple networks, and the rate of technology improvement is much slower on the proprietary networks, as compared to Ethernet networks.

BRIEF SUMMARY OF THE INVENTION

In one aspect, an Ethernet switch is provided that includes a plurality of ports, wherein the switch is configured to be operable within a temperature range of at least between approximately 0° C. and approximately 60° C. The switch is further configured to be operable within a non-condensing humidity range of at least between approximately 10% and approximately 95%. The switch is further configured to support at least one of a Virtual Local Area Network (VLAN), a Quality of Service (QoS), a Remote Monitoring (RMON), and a Spanning Tree, and the switch is configured to be upgradeable using a plug in device.

In another aspect, a production system is provided. The production system includes at least one office device, at least one industrial device, and at least one Ethernet switch positioned in an industrial environment and coupling the office device to the industrial device. The Ethernet switch includes a plurality of ports, and the Ethernet switch is configured to be operable within a temperature range of at least between approximately 0° C. and approximately 60° C. The switch is further configured to be operable within a non-condensing humidity range of at least between approximately 10% and approximately 95%. The switch is further configured to support at least one of a Virtual Local Area Network (VLAN), a Quality of Service (QoS), a Remote Monitoring (RMON), and a Spanning Tree.

In a further aspect, a method for networking is provided. The method includes positioning at least one device in an office environment (office device), and positioning at least one device in an industrial environment (industrial device). The method also includes positioning at least one Ethernet switch in the industrial environment, wherein the Ethernet switch comprises a plurality of ports, said Ethernet switch configured to be operable within a temperature range of at least between approximately 0° C. and approximately 60° C., said switch further configured to be operable within a non-condensing humidity range of at least between approximately 10% and approximately 95%, said switch further configured to support at least one of a Virtual Local Area Network (VLAN), a Quality of Service (QoS), a Remote Monitoring (RMON), and a Spanning Tree. The method also includes coupling the office device to the industrial device via the Ethernet switch.

DETAILED DESCRIPTION OF THE INVENTION

Figure 1:
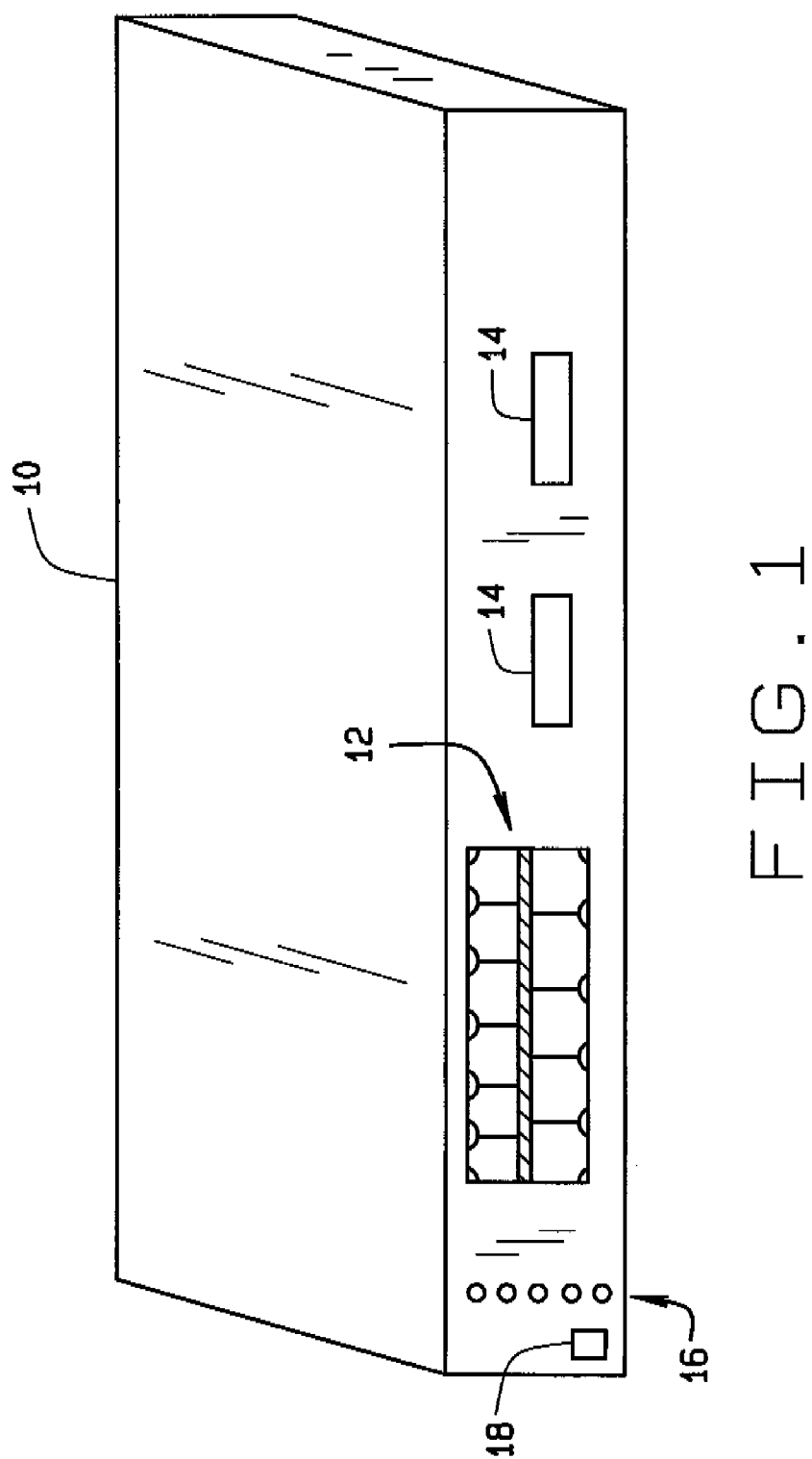
FIG. 1 is a perspective view of a hardened Ethernet switch.

FIG. 1 is a perspective view of a hardened Ethernet switch 10 including a plurality of ports 12. In one embodiment, ports 12 are 10Base-T/100Base-TX autosensing ports with each port 12 delivering up to 200 Mbps of bandwidth. In another embodiment, ports 12 are 10/100 switched ports with integrated inline power. Switch 10 also includes zero or more Gigabit Ethernet ports 14. In an exemplary embodiment, switch 10 includes six ports 12 and two Gigabit Ethernet ports 14. Gigabit Ethernet ports 14 are configured to be one or more of a 1000Base-X port, a 1000Base-T port, a 1000Base-SX port, a 1000Base-LX/LH port, and a 1000Base-ZX port. Ports 12 and 14 accept various cabling mediums including, for example, but not limited to, copper and fiber optic including both single and multi-mode fiber. Switch 10 also includes a plurality of light emitting diodes 16 and an on/off switch 18. Switch 10 provides a Port-based reclassification ability which allows users to reclassify IEEE 802.1p class-of-service (CoS) values on a per-port basis via a command-line interface (CLIs) enabling a fine granularity of control to implement local area network (LAN) edge quality of service (QoS). The Port-based reclassification also enables switch 10 to change the CoS settings of tagged packets on a per-port basis.

For example, with untagged packets, switch 10 uses a default ingress port priority to classify the packets wherein a priority scheduling is applied between a plurality of queues including a low priority queue and a high priority queue. The priority scheduling ensures that the high priority queue is always serviced before scheduling the lower priority traffic. The priority scheduling enables a user to prioritize mission critical traffic, such as Input/Output Process data, Voice over IP (VOIP) and/or Enterprise Resource Planning (ERP)

applications over regular traffic, such as, for example, but not limited to, File Transfer Protocol (FTP) or low-priority Web surfing traffic.

Switch 10 is hardened in that switch 10 is configured to operate in harsh environments with respect to temperature, humidity, and vibration. Specifically, switch 10 remains operational in environments of temperatures of at least between 0° Celsius (C) and 60° C., a non-condensing humidity range of at least between 10% and 95%, and an extended vibration level of 2 g (gravity). In an exemplary embodiment, switch 10 also is configured to be operable after sustaining a 4 g shock vibration. In one embodiment, switch 10 remains operational in environments of temperatures between −10° C. and 60° C., a non-condensing humidity range of between 5% and 97%, and an extended vibration level of 3 g. In another embodiment, switch 10 remains operational in environments of temperatures between −15° C. and 75° C., a non-condensing humidity range of between 2% and 98%, and an extended vibration level of 3.5 g. In a further embodiment, switch 10 remains operational above a temperature of approximately 55° C. In a still further embodiment, switch 10 remains operational above a temperature of approximately 60° C. In an exemplary embodiment, switch 10 is hardened as above without utilizing a fan inside of switch 10. Alternatively, switch 10 includes a fan (not shown). In one embodiment, switch 10 has a Mean Time Between Failures (MTBF) of at least 100,000 hours. In an alternative embodiment, switch has a MTBF of at least 150,000 hours.

Additionally, switch 10 can automatically configure Virtual LANs (VLANs) and trusted-extension settings for Internet Protocol (IP) telephones by overlaying a voice topology onto a data network and maintaining the quality of voice traffic. Therefore, a network administrator can segment phones into separate logical networks even though the data and voice infrastructure is physically the same. A user plugs a phone into switch 10, and switch 10 provides the phone with the necessary VLAN information because switch 10 places the phones into their own VLANs without any end-user intervention. Additionally, devices other than phones can be placed in their own VLANs to isolate control and I/O traffic and devices on their own respective VLANs.

In one embodiment, switch 10 is also stackable with other switches 10 to aggregate bandwidth in both a cascade configuration and a star configuration. In either configuration, the stacked switches 10 together operate as a single switch and each switch 10 includes a switch connection port (not shown) and is configurable to be a command switch or a member switch in the switch stack. In alternative embodiments, switches 10 may and or may not be configurable as one unit, but will act as one in all other aspects. For example, operation of multiple switches 10 will be as one, but, in one embodiment, each switch 10 is configured separately. The command switch serves as a single IP address management point and disburses all management instructions dictated by a network administrator. In other words, when a first switch 10 is connected to a second switch 10, the switches (first and second) cooperatively operate as one switch. In one embodiment, switch 10 does not include a switch connection port, and switches 10 are interconnected via Gigabit Ethernet ports 14. Additionally, switch 10 is configured to autosense, autonegotiate, and autoconfigure. Autosensing on each port 12 detects a speed of an attached device and automatically configures that port 12 for 10 or 100 Mbps operation, facilitating a deployment of switch 10 in a mixed 10Base-T and 100Base-TX environment. Autonegotiating on all ports 12 automatically selects a half- or full-duplex transmission mode to optimize bandwidth. And autoconfiguration facilitates deploying switch 10 in a network by automatically configuring multiple switches across the network via a boot server.

A default configuration is stored in a Flash memory or other type of non-volatile memory (not shown) within switch 10 that ensures that switch 10 can be quickly connected to a network and can pass traffic with little or no user intervention, and preserving configuration in case of a power outage to switch 10. In an exemplary embodiment, switch's 10 operating software is embedded in hardware (e.g., an application specific integrated circuit, ASIC) and total bandwidth of a backplane (not shown) inside switch 10 is at least twice the sum of the bandwidth of all ports 12 and 14 such that switch 10 operates substantially at wire speed. Switch 10 supports Simple Network Management Protocol (SNMP), and switch 10 includes a Telnet interface support that delivers comprehensive in-band management, and a CLI-based management console that provides detailed out-of-band management. In an exemplary embodiment, switch 10 includes an Embedded Remote Monitoring (RMON) software agent that supports four RMON groups (History, Statistics, Alarms, and Events) for enhanced traffic management, monitoring, and analysis. In an alternative embodiment, switch 10 supports all nine RMON groups (Statistics, History, Alarm, Host, HostTopN, Matrix, Filters, Packet Capture, and Events). In other embodiments, switch 10 supports less than all nine RMON groups.

Switch 10 is configured to support IEEE 802.1D Spanning-Tree Protocol such that switch 10 provides for redundant backbone connections and loop-free networks which simplifies network configuration and improves fault tolerance. Switch 10 also includes embedded software enabling QoS features which allow a user to build networks with switch 10 that conform to both the Internet Engineering Task Force (IETF) Integrated Services (IntServ) model and/or the Differentiated Services (DiffServ) model.

The embedded QoS features also provide value-added functionality such as network-based application recognition (NBAR) for classifying traffic on an application basis, a service assurance agent (SAA) for end-to-end QoS measurements, and a Resource Reservation Protocol (RSVP) signaling for admission control and reservation of resources. The QoS features provide a solution for controlling available bandwidth and managing it efficiently to meet application demands. The QoS features include mechanisms such as, but not limited to, link fragmentation and interleaving (LFI), Compressed Real-Time Protocol (CRTP), Weighted Fair Queuing (WFQ), and Low-Latency Queuing (LLQ).

The QoS features also support Class-Based Weighted Fair Queuing (CBWFQ), committed access rate (CAR), generic traffic shaping (GTS), and Weighted Random Early Detection (WRED). Switch 10 also supports QoS-enabled virtual private networks (VPNs), non-VPN services, Multiprotocol Label Switching (MPLS), QoS-to-ATM Class of Service (CoS), Frame Relay traffic shaping (FRTS), and Frame Relay Fragmentation (FRF). Switch 10 is configured to map RSVP reservations to an ATM permanent virtual circuit (PVC) and/or a switched virtual circuit (SVC) if desired.

In use, switch 10 is connected to a plurality of user devices such as, but not limited to, a computer, a programmable logic controller (PLC), input-output (P/O) devices, other switches, and all other Ethernet enabled devices. As used herein "user device" refers to any and all Ethernet enabled devices including an internet backbone interface typically provided by a telephone company enabling access to the Internet, and all other Ethernet enabled devices not typically termed "user" devices. Switch 10 transfers data between the user devices and remains operational in harsh environments with temperatures between 0° C. and 60° C., and non-condensing humidity ranges between 10% and 95%. Accordingly, a plurality of user devices are cost efficiently networked together, with many features such as QoS, RMON, and VLAN, in a non-office environment by at least one switch 10.

Although it is known to use ethernet switches in industrial settings, the switches utilized are basic switches that do not include high-end functionality. Hardened ethernet switch 10, in accordance with one embodiment of the present invention, is feature laden since it includes one or more of the high-end features in an industrial capable switch. The high-end features include, but are not limited to, VLAN, RMON, QoS, and Spanning Tree.

Typically, switch 10 is hardened during a design phase. For example, either a known office switch is re-designed to be hardened as described herein, or a new switch is designed to be hardened as described herein. There are several methods for upgrading a known office grade switch for industrial use. There are also several methods for creating an industrial grade switch. Hardening the office grade switch enables the switch to operate in an extended operating temperature range (0–60 degrees C.), in still or non-moving air, without the benefit of moving ambient air or forced airflow (i.e. fans). To accomplish the extended operating temperature range, a thermal analysis of the office switch (device) is performed to determine hot spots within the switch (device). A re-layout and re-design of the printed circuit board enables the major heat producers (e.g., Integrated Circuits (ICs)) to be separated on the circuit board. Each component in the device is analyzed to determine if that component can operate within the extended temperature range desired. This analysis may be done with the assistance of the manufacturers of the various components to determine the supportable range of the devices. Alternatively, the component manufacturers are not used to determine the supportable range of the components. In the event that a component does not operate well at the desired ambient temperature, the printed circuit board layout is changed by repositioning parts with lower ratings (i.e., do not operate well at higher temperatures) in cooler areas on the board.

Several steps may be taken to facilitate cooling the components,. For example, a horizontally mounted board may be vertically mounted and vice-versa. Also, vents may be included in any or all sides (including the top and the bottom) of the housing. Additionally, a single horizontal board can be re-designed as multiple vertical boards, such that the greatest heat producing components are re-positioned near the top so the heat rises away from the switch. Re-positioning lower rated components near the bottom of such boards will also facilitate the board operating in the extended temperature range.

In addition to designing a layout of the components, taking account of the thermal analysis that was done, known heat-sink technologies can be utilized. In one embodiment, heat-sinks are used that do not rely on forced air flow. One method of using heat sink technology is to connect good heat conductors to the main heat producers and maximize the surface area of the conductors. Heat-sinks with metal fins are also a good, effective method. Creative designs also allow for using portions of the packaging as a large heat sink. For example, tying a major heat producer (e.g. a large, power-hungry IC) back to the bottom of the metal case of the device can be effective and inexpensive.

Throughout each design phase, modeling and testing is done, and final temperature ratings can be verified by final complete system testing. In other words, design and component ratings are not relied upon exclusively to determine actual performance characteristics of the overall device, but are confirmed by utilizing an initial production of at least one working model and testing the working model at the desired temperature. Additionally, a final thermal analysis can be performed to further identify areas for improvement in heat dissipation.

Switch 10 is easily upgradeable using plug in devices. For example, in one embodiment switch 10 is upgradeable using Flash-card updates. In other embodiments, switch 10 is upgradeable using a plug in device other than a Flash-card. In both Flash and non-Flash embodiments, a separate device is plugged into switch 10 and the separate device contains an updated configuration or firmware. This device is able to be plugged directly onto switch 10 to download the latest firmware/configuration or both. The device is similar to a known memory stick for known digital cameras but instead of just supplying more storage capacity, it also updates switch 10. In one embodiment, this is accomplished with a retentive type of memory in the card device. The memory can be Flash, EEPROM, EPROM, battery-backed RAM, or any other type of retentive memory. The card is programmable and configurable and have both upload & download capabilities. The flash card may or may not be hardened.

Switch 10 also includes multiple diagnostic contacts (not shown). The multiple diagnostic contacts include a contact for each individual port 12, so that a health/status of each port 12 may be determined. Additionally, all ports 12 are configurable for Hot-standby. As used herein, "Hot-standby" means that if a problem occurs with a particular port 12, switch 10 automatically switches to another other port 12 to send and receive data. In one embodiment, the multiple diagnostic contacts are implemented by having a plurality of normally open contacts that close when detecting a failure of any individual port. Further, the contacts are configurable to report on other health issues, specifically bandwidth utilization. A low threshold and a high threshold are able to be set enabling the contact to create a report. Additionally, the contacts are configured to operate collectively as an analog output. In this fashion, error codes and messages may be configured and sent when appropriate diagnostic events occur. The multiple diagnostic contacts are tied into the SNMP functionality and support the same command set. In one embodiment, the Hot-standby is implemented by monitoring the active port. The active port is the one that is currently in use. The back-up port is the one not currently in use. The monitoring looks for inactivity for a configurable (or fixed) period of time. Inactivity signals a switch to the back-up port. In deployment, both active & back-up ports are wired so that the switch may occur without human intervention and at rapid speeds. When the back-up is in use, this condition is signaled to the operators via SNMP, LEDs, or any other output mechanism (e.g. diagnostic contact).

Switch 10 further includes an audible failure mode such that when switch 10 is experiencing any type of failure, then switch 10 makes an audible noise such as but not limited a loud sound or energizes a siren. In one embodiment, switch 10 produces a speech call for help such as "Switch in sector 3 is experiencing high bandwidth", thus alerting a local worker in the production area to get a technician to diagnose the device. In one embodiment, the audible failure mode is implemented by having a speaker in the unit and tying it to error conditions. The audible failure mode is fully configurable including the ability to turn off all audible warnings.

Switch 10 also includes an auto-enunciation mode wherein switch 10 takes an automatic action to another device upon certain configurable events. In one embodiment, Auto-enunciation occurs when bandwidth for the network is reaching a high level, or a failure of part of the switch or network occurs. For example, switch 10 is configured in the auto-enunciation mode to signal an alphanumeric pager with a warning message when a pre-determined event has occurred.

In an exemplary embodiment, switch 10 includes at least one of an infrared (IR) interface and a radio frequency (RF) interface. Accordingly, switch 10 is configured for wireless communication with hand-held devices and other wireless devices. This is implemented by taking an IR interface or an RF interface and attaching the interface to the front/visible section of the switch. The IR and RF interface operate exactly the same as other interfaces. These interfaces are typically RS-232 (serial) or and RJ-45 Ethernet jack.

Figure 2:
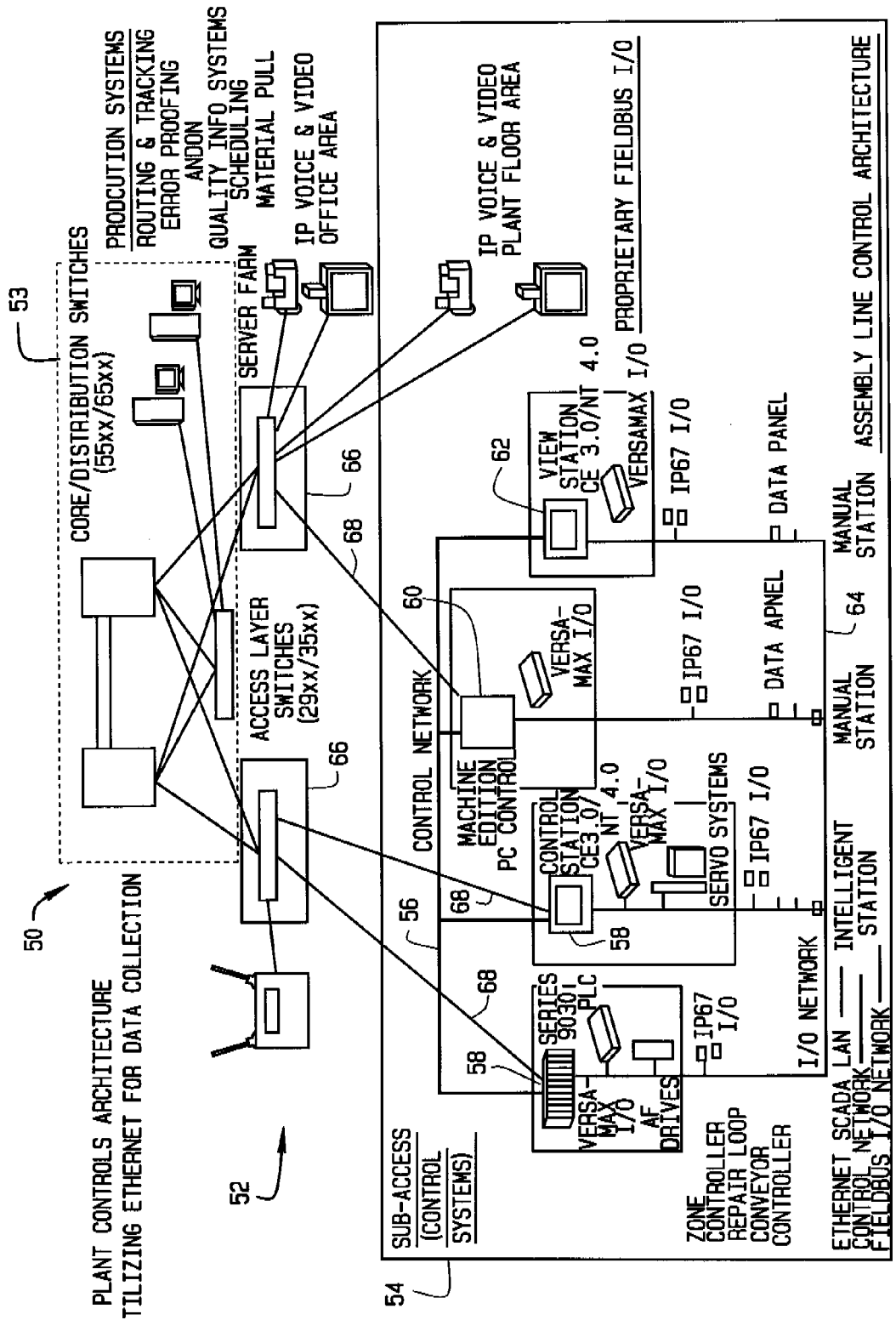
FIG. 2 illustrates a known production system.

FIG. 2 illustrates a known production system 50 including an office (or enterprise) side 52 and a production (or industrial) side 54. As used herein "office side" refers to areas that are environmentally controlled (i.e., an office environment) with heating and air-conditioning such that the temperature therein is maintained within typical human comfort levels. "Production side" refers to all non-office areas including areas outside a building (i.e., an environment other than an office environment also referred herein as an industrial environment). Furthermore, as used herein, an "office device" refers to any and all Ethernet enabled devices located in an office environment, and an "industrial device" refers to any and all Ethernet enabled devices located in an environment other than an office environment. Office side 52 is networked using an Ethernet IP (Internet protocol) based Enterprise network 53, and production side 54 is networked using a plurality of different legacy propriety network protocols. For example, a control network 56 connects a plurality of process controllers 58 to each other, and also connects at least one personal computer 60 (PC) and at least one view screen 62 together and to process controllers 58. Process controllers 58, typically are programmable logic controllers (PLCs) and computer numeric controllers (CNCs), but process controllers can be industrial computers or other smart controllers. Therefore, as used herein, "process controller" refers to any and all devices capable of controlling a process. A device network 64, which is a separate network from control network 56 and Ethernet network 53, connects a plurality of input/outputs (I/Os) 66 and other end devices, such as, for example, but not limited to, motors, drives, and cameras to each other and to process controllers 58.

Device and control networks 64 and 56 are not only separate and distinct from Ethernet network 53, but they are typically proprietary. It may be less than optimal to have so many networks, and also may be expensive because the formation of so many networks includes numerous components which may cost more than forming a single network. Additionally, when maintaining so many networks, more spare parts typically are stocked, maintenance workers must be trained on multiple networks, and the rate of technology improvement is much slower on the proprietary networks, as compared to Ethernet networks. However, the legacy proprietary networks have persisted because they are able to provide components that work in a hardened environment, and are also able to provide determinism. Determinism is the concept of real-time delivery of data. However, control and device networks 64 and 56 are less than ideal at providing data back up to the Enterprise network 53 (which is already Ethernet capable). Accordingly, the Ethernet network is deployed by a plurality of access layer switches 66 and Ethernet lines 68, to collect data out of production environment 54 and into Enterprise side 52.

Figure 3:
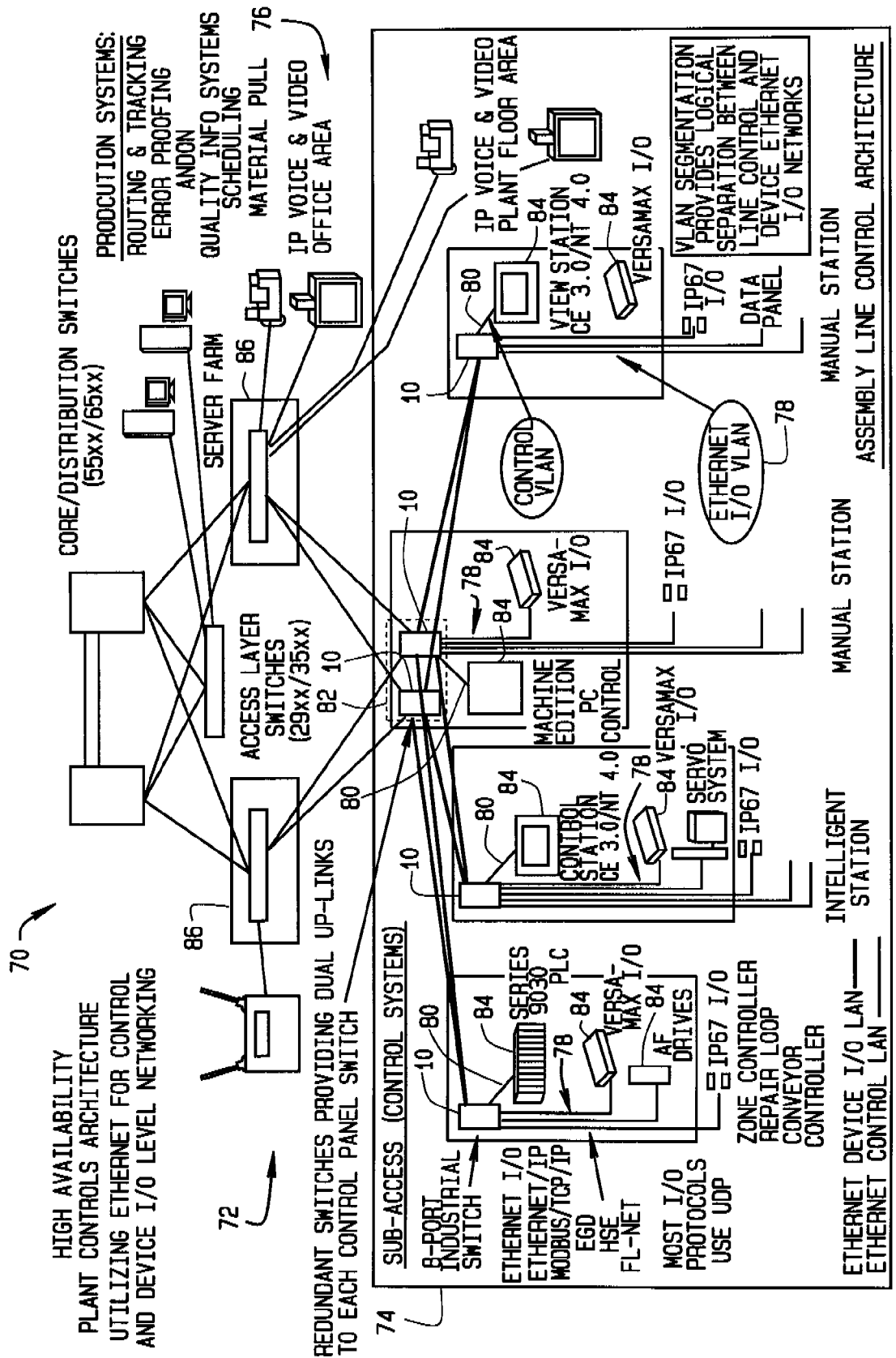
FIG. 3 is an illustration of a production system.

FIG. 3 is an illustration of an exemplary production system 70 including an Enterprise side 72 and a production side 74 including at least one switch 10. Switch 10 enables an Ethernet network to be suitable, not only on Enterprise (office) side 70, but also to act as a control and device network. In other words separate networks (such as networks 53, 56, and 64, shown in FIG. 2) are collapsed to form a single Ethernet network 76, and enabling cost savings.

Switch 10 provides for real-time delivery of mission critical data, and is well suited to industrial environments as explained above.

More specifically, switch 10 includes a VLAN functionality which allows a virtual separation of single network 76 into multiple 'virtual' separate networks such as a control VLAN 80 and a device I/O VLAN 78. This prevents, for example, bandwidth monopolizing broadcast traffic from the office off the mission critical Industrial networks 78 and 80. Space and expandability are typically important in an industrial environment, thus the ability to stack on switches as desired is desirable and switch 10 being stackable facilitates a scalability of system 70. Production system 70 also includes a control center 82 including two switches 10 configured redundantly between a plurality of switches 10 controlling a plurality of devices 84 and a plurality of access layer switches 86. All data transfer from office side 72 to production side 74 passes through control center 82. If one of the two switches 10 in control center 82 should fail then the other switch 10 takes over the failed switches duties.

Additionally, in one embodiment, switch 10 is configured for bandwidth up to 1 Gigabit speeds for network 76. Mission critical applications often have the need for redundancy, as well as standards, and thus the benefit of spanning tree redundancy is provided in switch 10. Remote monitoring of the various devices is critical and thus switch 10 includes RMON capabilities as described above.

Additionally, a plurality of external diagnostic contacts tie several of these features together, allowing I/O modules to be connected to switch 10 to detect a failure, enabling various actions to be taken during the redundant switch over. These actions can vary from a graceful shutdown of the system to additional notifications sent by PLCs, to a controlled switch-over of the control processes.

Accordingly a hardened Ethernet switch is provided that enables both an office space and a non-office space of a facility to be networked in a single network, and allows separate VLANs preserving a virtual separation of networks for management and security reasons.

While the invention has been described in terms of various specific embodiments, those skilled in the art will recognize that the invention can be practiced with modification within the spirit and scope of the claims.

What is claimed is:

1. A feature laden Ethernet switch comprising:
    a plurality of ports, said Ethernet switch configured to operate above a temperature of approximately 55° C., said switch further configured to support at least one high-end feature, and said Ethernet switch configured to separate, into a plurality of virtual local area networks, an industrial environment network within an industrial environment other than a temperature controlled environment, wherein said Ethernet switch configured to transfer data between the temperature controlled environment and the industrial environment; and
    a plurality of diagnostic contacts comprising a contact for each said port.

2. An Ethernet switch in accordance with claim 1 wherein said switch is further configured to be upgradeable using a plug in device.

3. An Ethernet switch in accordance with claim 1 wherein said at least one high-end feature includes at least one of a Virtual Local Area Network (VLAN), a Quality of Service (QoS), a Remote Monitoring (RMON), and a Spanning Tree.

4. An Ethernet switch in accordance with claim 1 wherein said switch is configurable in at least one of an audible failure mode and an auto-enunciation mode.

5. An Ethernet switch in accordance with claim 1 wherein said switch is further configured to operate within a non-condensing humidity range of at least between approximately 10% and approximately 95%.

6. An Ethernet switch in accordance with claim 1, wherein said switch further comprises at least one of an infrared (IR) interface and a radio frequency (RF) interface operationally coupled to at least one of said ports.

7. A production system comprising:
   at least one office device comprising a plurality of office devices;
   at least one industrial device comprising a plurality of industrial devices; and
   at least one feature laden Ethernet switch positioned in an industrial environment and coupling said at least one office device to said at least one industrial device, said Ethernet switch comprising a plurality of ports and configured to operate above a temperature of approximately 55° C., said switch further configured to support at least one high-end feature, said switch configured to maintain said office devices in an office device VLAN, said switch configured to maintain said industrial devices in one of a VLAN separate from said office device VLAN and a plurality of VLANs all separate from said office device VLAN.

8. A production system in accordance with claim 7 wherein said switch is further configured to be upgradeable using a plug in device.

9. A production system in accordance with claim 7 wherein said at least one high-end feature includes at least one of a Virtual Local Area Network (VLAN), a Quality of Service (QoS), a Remote Monitoring (RMON), and a Spanning Tree.

10. A production system in accordance with claim 7 wherein said switch is further configured to operate within a non-condensing humidity range of at least between approximately 10% and approximately 95%, and said switch further comprises at least one of an infrared (IR) interface and a radio frequency (RF) interface operationally coupled to at least one of said ports.

11. A production system in accordance with claim 7 wherein said plurality of VLANs comprises:
    at least one control VLAN; and
    at least one input/output (I/O) VLAN.

12. A production system in accordance with claim 7 wherein said at least one Ethernet switch coupling said at least one office device to said at least one industrial device further comprises at least two Ethernet switches redundantly coupling said at least one office device to said at least one industrial device.

13. A production system in accordance with claim 12 wherein each said Ethernet switch comprises a plurality of ports, each said Ethernet switch configured to operate within a temperature range of at least between approximately 0° C. and approximately 60° C., each said switch further configured to operate within a non-condensing humidity range of at least between approximately 10% and approximately 95%, each said switch further configured to support at least one of a Virtual Local Area Network (VLAN), a Quality of Service (QoS), a Remote Monitoring (RMON), and a Spanning Tree.

14. A production system in accordance with claim 7 wherein said Ethernet switch configured to be stackable with a second switch.

15. A production system in accordance with claim 7 wherein said Ethernet switch configured to transmit data at a speed of at least one Gigabit per second.

16. A production system in accordance with claim 7 wherein said Ethernet switch configured to operate substantially at wire speed.

17. A production system in accordance with claim 7 wherein said Ethernet switch configured to support a Virtual Local Area Network (VLAN), a Quality of Service (QoS), a Remote Monitoring (RMON), a Simple Network Management Protocol (SNMP), and a Spanning Tree.

18. A method for networking comprising:
    positioning at least one device in an office environment (office device);
    positioning at least one device in an industrial environment (industrial device);
    positioning at least one Ethernet switch in the industrial environment, wherein the Ethernet switch comprises a plurality of ports, the Ethernet switch configured to be operable within a temperature range of at least between approximately 0° C. and approximately 60° C., the switch further configured to be operable within a non-condensing humidity range of at least between approximately 10% and approximately 95%, the switch further configured to support at least one of a Virtual Local Area Network (VLAN), a Quality of Service (QoS), a Remote Monitoring (RMON), and a Spanning Tree;
    coupling the office device to the industrial device via the Ethernet switch;
    maintaining the office device in an office device VLAN; and
    maintaining the industrial device in a VLAN separate from said office device VLAN.

19. A method in accordance with claim 18 further comprising maintaining a plurality of industrial devices in a plurality of VLANs all separate from said office device VLAN.

20. A method in accordance with claim 19 wherein said positioning at least one device in an office environment (office device) comprises positioning a plurality of devices in an office environment (office devices), said method further comprising:
    maintaining the office devices in the office device VLAN, wherein said plurality of VLANs comprise:
    at least one control VLAN; and
    at least one input/output (I/O) VLAN.

21. A method in accordance with claim 18 wherein said positioning at least one Ethernet switch comprises positioning at least two Ethernet switches redundantly coupling the office device to the industrial device.

* * * * *